(12) United States Patent
Ward et al.

(10) Patent No.: US 9,439,163 B2
(45) Date of Patent: Sep. 6, 2016

(54) PROCESSING OF A COARSE LOCATION REQUEST FOR A MOBILE DEVICE

(71) Applicant: Cellco Partnership, Basking Ridge, NJ (US)

(72) Inventors: Rachel Yu-Yin Ward, Basking Ridge, NJ (US); Atul Thaper, Flemington, NJ (US)

(73) Assignee: Cellco Partnership, Basking Ridge, NJ (US)

(*) Notice: Subject to any disclaimer, the term of this patent is extended or adjusted under 35 U.S.C. 154(b) by 353 days.

(21) Appl. No.: 14/139,134

(22) Filed: Dec. 23, 2013

(65) Prior Publication Data
US 2015/0181550 A1 Jun. 25, 2015

(51) Int. Cl.
*H04W 64/00* (2009.01)
*H04W 4/02* (2009.01)

(52) U.S. Cl.
CPC ............... *H04W 64/00* (2013.01); *H04W 4/02* (2013.01)

(58) Field of Classification Search
CPC ........ H04W 64/00; H04W 8/08; H04W 4/02
See application file for complete search history.

(56) References Cited

U.S. PATENT DOCUMENTS

| 5,862,481 | A | * | 1/1999 | Kulkarni | H04W 88/16 455/432.2 |
|---|---|---|---|---|---|
| 7,714,779 | B2 | * | 5/2010 | Abraham | G01S 19/05 342/357.31 |
| 2002/0094820 | A1 | * | 7/2002 | Keranen | H04W 64/00 455/456.5 |
| 2004/0137918 | A1 | * | 7/2004 | Varonen | H04W 8/10 455/456.2 |
| 2005/0014500 | A1 | * | 1/2005 | Muhonen | H04W 64/00 455/433 |
| 2008/0228654 | A1 | * | 9/2008 | Edge | G01S 19/48 705/71 |
| 2010/0041418 | A1 | * | 2/2010 | Edge | H04W 4/02 455/456.2 |
| 2010/0075610 | A1 | * | 3/2010 | Dennard | H04W 4/02 455/67.11 |
| 2010/0228845 | A1 | * | 9/2010 | Choi | H04W 36/385 709/223 |
| 2013/0143602 | A1 | * | 6/2013 | Rodriguez | H04M 3/2236 455/456.5 |

* cited by examiner

*Primary Examiner* — Nathan Mitchell

(57) ABSTRACT

A location proxy server receives a network-initiated location request. The location proxy server determines the location request is a coarse location request for a mobile device. The location proxy server forwards the coarse location request for the mobile device to a location server. The location server completes a control plane function to determine the location of the mobile device and provides a location answer to the location proxy server. The location proxy server provides the location answer to the application server initiating the location request.

20 Claims, 7 Drawing Sheets

PROCESSING OF A COARSE LOCATION REQUEST FOR A MOBILE DEVICE

BACKGROUND

In recent years, mobile wireless communications have become increasingly popular. Presently, mobile devices such as laptops, personal digital assistants ("PDAs"), smartphones, cell phones, tablet PCs and other portable computers are rapidly gaining popularity. Mobile devices are available with interfaces enabling communications via mobile networks or local area network (LAN) wireless access points (hereinafter "wireless hotspot networks" or "hotspots"). Currently, mobile networks are operational that conform with the fourth generation (4G) standards, such as the Long Term Evolution (LTE) standard. These mobile networks provide voice communication, messaging, email and internet access (for example) by using radio frequency communication. Communications via hotpots may occur using a communications standard such as IEEE 802.11 ("WiFi") network type wireless access points.

In contrast to current 4G LTE networks providing communications services via packet-based infrastructure, legacy mobile wireless communications networks provide voice communications services via circuit-switched voice capability. Such legacy networks have well established techniques for responding to a network initiated coarse location request from a commercial application server for a mobile device capable of utilizing the legacy network (e.g., 3G and/or 3G/4G mobile device). Emerging mobile devices, however, may only be capable of utilizing the current 4G LTE networks and lack the capability to utilize any legacy network. Current 4G LTE networks may not have well established techniques for processing a location request from a commercial application server for a mobile device only capable of utilizing a current 4G LTE network. For example, a carrier may operate both a legacy network and a 4G LTE network. The carrier in this example may have deployed the necessary infrastructure to provide location services related to the legacy network, but may not have deployed the necessary infrastructure to provide similar location services for the 4G LTE network.

Thus, a need exists for techniques for processing a location request from a commercial application server for a mobile device only capable of utilizing a current 4G LTE network.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
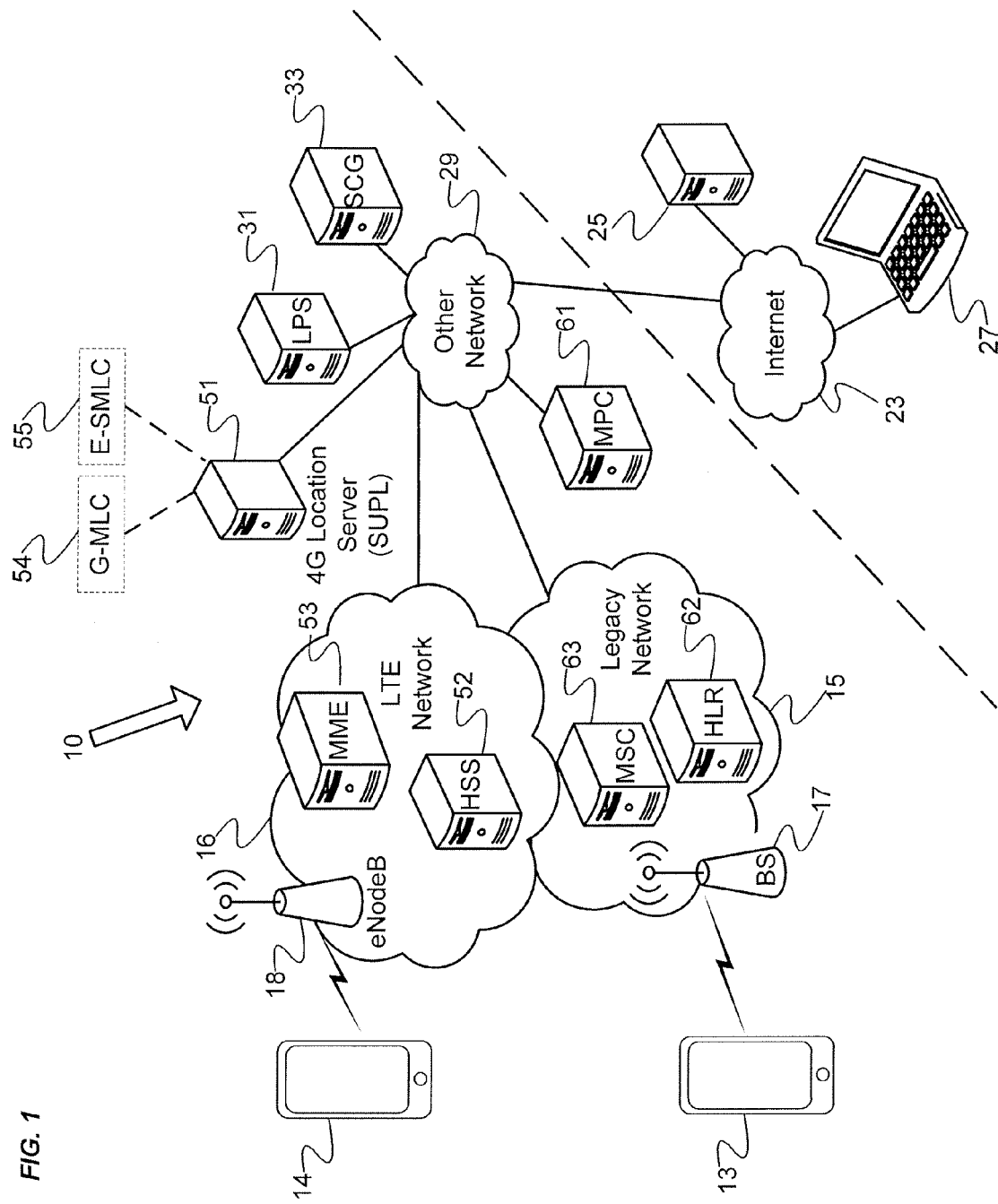
FIG. 1 is a functional block diagram of an example of a system which may process a location request from a commercial application server.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described in detail below relate to techniques for processing a coarse location request from a commercial application server. In one example, an application server desires to learn the general location of a mobile device. The application server, for example, provides news, weather, and/or other localized content and is configured to deliver location-related content to the mobile device. In order to determine the location of the mobile device and customize the location-related content, the application server submits a commercial location request to the mobile wireless communication network to which the owner of the mobile device subscribes for mobile communication services.

Such location request is initially submitted to a service control gateway (SCG) of the mobile wireless communication network. The SCG, for example, validates that the application server may submit the location request. The SCG further determines, for example, if the owner of the mobile device has set the appropriate privacy settings to allow the location request. Once the SCG validates and authorizes the location request, the SCG forwards the location request to a location proxy server (LPS) of the mobile wireless communication network.

The LPS, in this example, determines whether the location request is a fine or coarse location request. The threshold between fine and coarse location requests is, for example, a configurable parameter within the LPS. A fine location request may, for example, require requested accuracy within 1000 meters of the mobile device. Such fine location request, for example, typically requires interaction with an application and/or some other process executing on the mobile device that determines the specific location of the mobile device within a relatively short distance range. This direct interaction with an application and/or other process executing on the mobile device is commonly referred to as "user-plane." A coarse location request may, for example, allow requested accuracy equal to or greater than 1000 meters of the mobile device. The coarse location request, for example, is satisfied by a location response indicating the geographic "center," of the cell currently serving the mobile device. The position of the mobile device may be anywhere within the radio coverage area of the cellular transceiver having the cell identifier, e.g. with a range up to several thousand meters from the cell center.

Our examples relate to networks that offer the latest mobile wireless technology as well as one or more legacy mobile wireless technologies. In an example supporting 4G and 3G, once the LPS determines the location request is a coarse location request, the LPS determines, for example, if the mobile device is capable of only utilizing a fourth-generation (4G) long term evolution (LTE) network. Such determination, in this example, may be based on the presence of the mobile directory number (MDN) in a 4G device database of the LPS. If the mobile device is capable of only utilizing a 4G LTE network, based on the MDN of the mobile device being in the 4G device database, the LPS forwards the coarse location request to a 4G location server. The 4G location server will then utilize elements of the 4G LTE network, such as a mobility management entity (MME) and a home location register (HLR), to determine the cell identifier of the cell currently serving the mobile device. This use of network elements, as opposed to directly interacting with an application and/or other process executing on the mobile device or "user plane," invokes a "control plane" function. Thus, in our example, the LPS utilizes a control plane function via the 4G location server to determine a response to a coarse location request for a 4G-only capable mobile device from a commercial application server.

Reference now is made in detail to the examples illustrated in the accompanying drawings and discussed below. FIG. 1 is a functional block diagram of an example of a system 10 that supports various mobile communication services and which may implement processing for a location request from a commercial application server.

The illustrated system 10 services any number of mobile devices, including the illustrated mobile devices 13, 14. Each of the mobile devices 13, 14 may be a laptop, a personal digital assistant ("PDA"), a smartphone, a tablet PC or another portable device designed to communicate via a wireless network. Each of the mobile devices 13, 14 in our example corresponds to a smartphone or tablet itself having network communication capability. Although not shown for simplicity, the present location request techniques also may be used with other types of devices, for example, mobile broadband devices like Jetpacks or USB dongles that provide service connectivity for other types of data devices (e.g. non-mobile/wireless computers or the like) and an increasing variety of mobile network connected devices (e.g. cameras, e-Readers, etc.) that themselves may lack the hardware or programming to support a browser type user interface over the wireless network.

A carrier offering 3G and 4G mobile services operates a network having equipment forming a portion of the network supporting 3G services and equipment forming a portion of the network supporting 4G services. Although various network architectures may be used to form the network with the two portions, the drawing shows an arrangement using two networks 15, 16 operated by one mobile carrier. Hence, the illustrated system example includes a mobile communication network 16, in this case, operated in accordance with 4G long term evolution (LTE) standards. The illustrated system example also includes a mobile communication network 15, in this case, operated in accordance with one or more legacy network standards (e.g. code division multiple access (CDMA), Global System for Mobile (GSM) communication, etc.). A single carrier, for example, operates both of the mobile networks 15, 16, such that mobile network 15 and mobile network 16 are each portions of one carrier network within the system 10. Mobile networks 15, 16 may provide mobile telephone communications as well as Internet data communication services. For example, mobile networks 15, 16 may connect to the public switched telephone network (PSTN) and public packet-switched data communication networks such as the Internet 23. Data communications via mobile networks 15, 16 provided for users of devices like 13, 14 may support a variety of services such as communications of text and multimedia messages, e-mail, web browsing, streaming or downloading content, etc. with network connected equipment such as a server 25 and/or laptop computer 27 in the drawing. Although the networks provide access to data services offered by a variety of types of equipment identified as servers, for purposes of an example of a service using device location we will use 25 as an example of an application server. Voice communication also may involve transport via the Internet 23 using voice over Internet Protocol (VoIP) technologies. Mobile devices 13, 14 may connect to mobile networks 15, 16 through a cellular base station 17 or eNodeB 18, two of which appear in the drawing by way of example. Base station 17 and eNodeB 18 each operate in accordance with a different network standard, as described in greater detail below.

The networks 15, 16 provide mobile wireless communications services to mobile devices 13, 14 as well as to other mobile devices (not shown), for example, via a number of base stations (BSs) 17 and/or eNodeBs 18, depending on the network standard (e.g., LTE or legacy) supported by the mobile devices. In the examples, mobile device 13 contains one or more elements that support legacy network standards (e.g., CDMA and/or GSM) and may contain one or more elements that support the LTE network standard, however, mobile device 14 only contains one or more elements that support the LTE network standard. In the example of FIG. 1, base station 17 and eNodeB 18 may cover the same geographical area, such that mobile device 13 and mobile device 14 may both be serviced in the same geographical area respectively by base station 17 and eNodeB 18. Alternatively, or in addition, base station 17 or other base stations (not shown) and eNodeB 18 or other eNodeBs (not shown) may each cover different geographical areas, such that mobile device 13 may only be serviced when geographically proximate to base station 17 or one of the other base stations and mobile device 14 may only be serviced when geographically proximate to eNodeB 18 or one of the other eNodeBs.

In some examples, when mobile device 13 supports both LTE and legacy network standards, mobile device 13 will be serviced when geographically proximate either base station 17 or eNodeB 18. In addition, when mobile device 13 is geographically proximate to both base station 17 and eNodeB 18 (e.g., when base station 17 and eNodeB 18 cover the same geographical area), mobile device 13 may receive some services via base station 17 and some services via eNodeB 18 and/or may receive service interchangeably between base station 17 and eNodeB 18. In the examples, however, mobile device 14 only supports the LTE network standard and only receives service via eNodeB 18. Alternatively, mobile device 14 may support both the LTE network standard and one or more legacy network standards, however, mobile device 14 is only capable of being serviced either by base station 17 or eNodeB 18, even if both base station 17 and eNodeB 18 cover the same geographical area.

The illustrated system 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile devices 13, 14, can include one or more RANs and a regional circuit and/or packet switched network and associated signaling network facilities.

Physical elements of a RAN of mobile network 15, operated by one of the mobile service providers or carriers, include a number of base stations represented in the example by the base station (BS) 17. Although not separately shown, such a base station 17 can include a base transceiver system (BTS), which can communicate via an antennae system at the site of base station and over the airlink with one or more of mobile device 13, when the mobile devices are within range. Each base station can include a BTS coupled to several antennae mounted on a radio tower within a coverage area often referred to as a "cell." The BTS is the part of the radio network that sends and receives RF signals to/from the mobile device 13 that is served by the base station 17. Such RAN encompassing base station 17 operates in accordance with a legacy network standard (e.g., CDMA and/or GSM).

Alternatively, or in addition, physical elements of a 4G LTE RAN of mobile network 16 include a number of nodes referred to as eNodeBs represented in the example by the eNodeB 18. Such eNodeB 18 implements similar wireless link and routing/control purposes as base station 17, but operates in accordance with the more modern LTE network standard, sometimes referred to as 4G and/or 4G LTE. Packet routing and control functions may be implemented in packet routers and/or associated server platforms in the radio access network (RAN) or in many cases in elements of an IP Multimedia Service (IMS) core network (not shown separately) coupled to some number of 4G RANs, although such routing and control element(s) are generically included in the broad class of devices that may be used to implement the network functionality discussed here.

The radio access networks can also include a traffic network represented generally by the clouds at 15, 16, which carries the user communications and data for the mobile devices 13, 14 between the base station 17 and/or eNodeB 18 and other elements with or through which the mobile devices communicate. The networks can also include other elements that support functionality such as messaging service messages and voice communications. Specific elements of the networks 15, 16 for carrying the voice and data traffic and for controlling various aspects of the calls or sessions through the networks 15, 16 are omitted here for simplicity. It will be understood that the various network elements can communicate with each other and other aspects of the illustrated system 10 and other networks (e.g., the PSTN (not shown) and the Internet 23) either directly or indirectly.

The carrier will also operate a number of systems that provide ancillary functions in support of the communications services and/or application services provided through the system 10, and those elements communicate with other nodes or elements of the system 10 via one or more packet data networks 29. Generally, such systems are part of or connected for communication via the packet data network 29. It should be apparent, however, that systems outside of the packet data network could serve the same functions as well. Examples of such systems, in this case operated by the network service provider as part of the overall network system 10, which communicate through the packet data network 29, include one or more location proxy servers 31, one or more mobile position centers (MPCs) 61 for locating a mobile device 13, one or more 4G location servers 51 for locating a mobile device 14, and a related one or more service control gateways 33. Billing and provisioning systems, discussed later in more detail, may also communicate via network 29.

A mobile device 13 communicates over the air with a base station 17 and through the traffic network 15 for various voice and data communications, e.g. through the Internet 23 with a server, such as application server 25. Similarly, a mobile device 14 communicates over the air with an eNodeB 18 and through the traffic network 16 for various voice and data communications, e.g. through the Internet 23 with a server such as the application server 25. If the application server 25 desires to determine the location of mobile device 13 or mobile device 14, e.g. when location related information is requested by or otherwise to be sent to a mobile device, the server 25 may utilize the techniques for processing a location request from a commercial application server as described in greater detail below.

Figure 2:
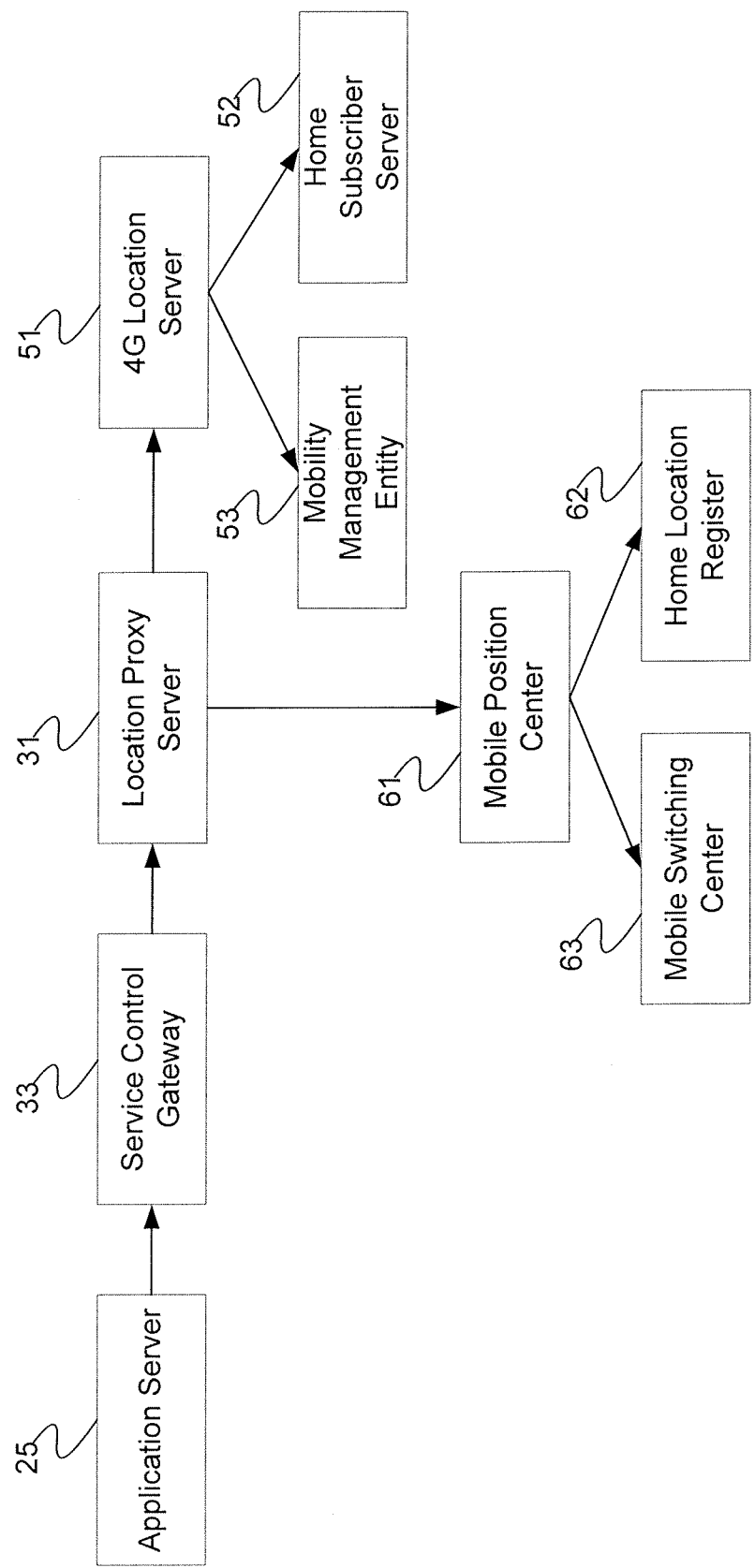
FIG. 2 is a flow diagram of an example of the system of FIG. 1 which may process the location request from the commercial application server.
Figure 4:
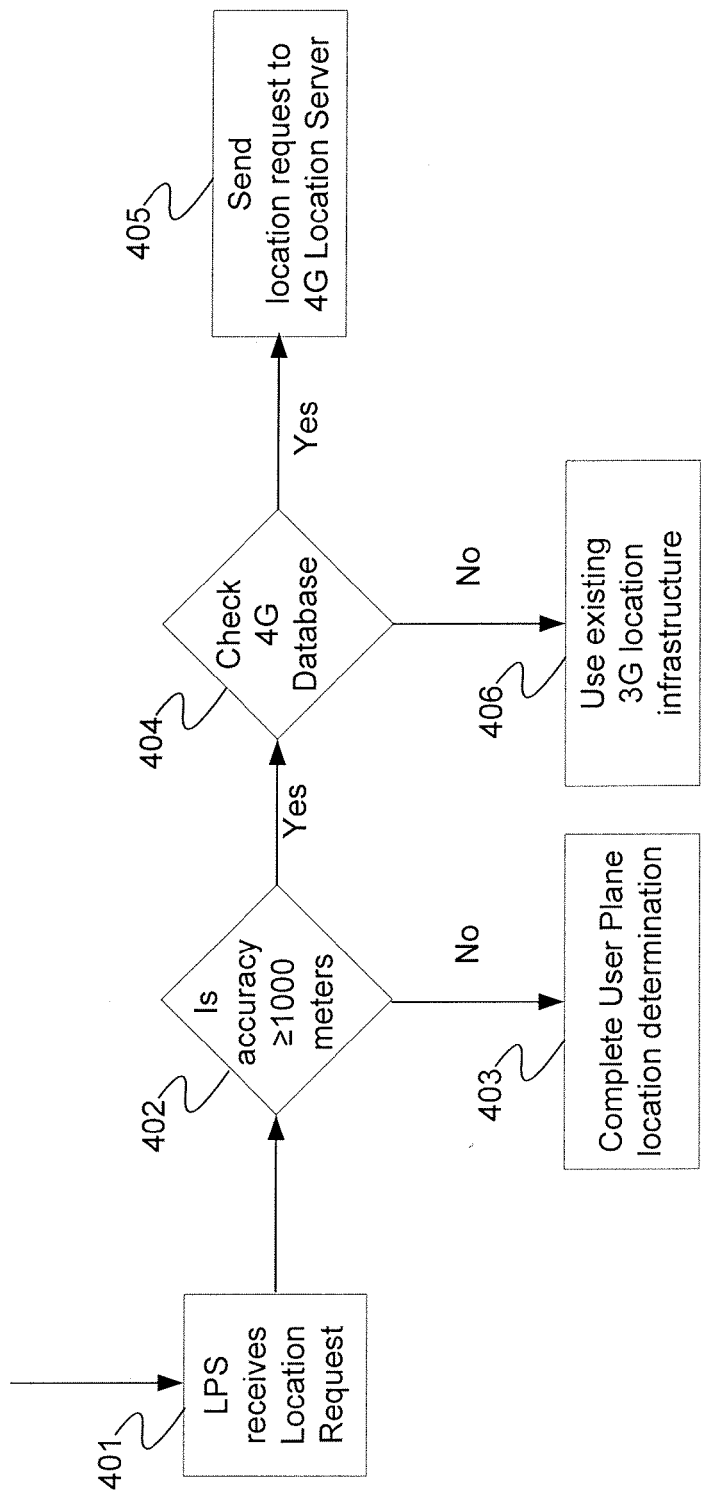
FIG. 4 is a flow diagram of an example of processing a location request as implemented by the system represented by FIG. 1.

Mobile network 15 includes one or more home location registers (HLRs) 62 and one or more mobile switching centers (MSCs) 63 with which the one or more MPCs 61 interacts to complete a location determination, such as described in greater detail in relation to FIGS. 2 and 4. HLR 62 is a database of customer profile records and subscribers' mobile devices currently authorized to utilize services provided by mobile network 15. MSC 63 is the element within mobile network 15 that actually provides services, via base station 17, to mobile device 13.

Mobile network 16 similarly includes one or more home subscriber server (HSS) 52 and one or more mobility management entities (MMEs) 53 with which the one or more 4G location servers 51 interacts to complete a location determination, such as described in greater detail in relation to FIGS. 2-6. HSS 52, in the LTE network 16, provides similar functionality to HLR 62, in the legacy network 15. Likewise, although MME 53, in the LTE network 16, does not provide the same call "switching" as MSC 63, in the legacy network 15, the MME 53 does provide similar control and management functionality to the MSC 63.

4G location server 51 is, for example, a secure user plane location (SUPL) server. SUPL is an IP-based protocol used by Assisted global positioning system (GPS) to facilitate receiving GPS satellite information quickly. 4G location server 51 includes, for example, a Gateway Mobile Location Center (G-MLC) 54 function and an Enhanced Serving Mobile Location Center (E-SMLC) 55 function. The G-MLC 54 is, for example, a component within the 4G location server 51 responsible for receiving a coarse location request from the LPS 31, initiating a control plane function within mobile network 16 to determine the location of mobile device 14, and sending a location answer in response to the location request to the LPS 31. The E-SMLC 55 is, for example, a component within the 4G location server 51 responsible for receiving a location request containing a cell identifier from the MME 53, determining a location estimate of the cell identified by the cell identifier (e.g., center latitude and center longitude of the cell), and providing the location estimate to the MME 53 in a location response.

Application server 25 is, for example, an application server that provides news, weather, and/or other localized content to mobile devices 13, 14. Such content, for example, is customized based on the general location of mobile devices 13, 14. In one example, the application may be a weather application and the localized content may be the weather for the city in which mobile devices 13, 14 are currently located. In another example, the application may be a news application and the localized content may be a news flash related to the local area in which mobile devices 13, 14 are currently located. The application server 25 may provide such content upon request from a mobile device or other user terminal, or the application server 25 may push content to a mobile device (e.g. as event notifications). The application server 25 may be operated by the carrier that operates the networks 15, 16. Alternatively, the application server 25 may be operated by a third-party, i.e. an entity other than the carrier and the mobile device user(s).

Application server 25, in order to customize content to be delivered to one of mobile devices 13, 14, may generate a location request of either a first or second type for one of mobile devices 13, 14. In one example, application server 25 only needs to know the general location of one of mobile devices 13, 14 and submits a location request of a first type. In another example, application server 25 needs to know the specific location of one of mobile devices 13, 14 and submits a location request of a second type. The location request of the first type is, for example, a coarse location request. The location request of the second type is, for example, a fine location request.

A coarse location request is a location request with a requested location accuracy (e.g., enhanced quality of position or eqop) equal to or greater than 1000 meters. Such coarse location request may be fulfilled by providing a position description (pd) related to the cell identifier of a cell currently serving one of mobile devices 13, 14. The pd is an extensible markup language (XML)-based field in a standard location immediate answer message that provides a geographically based description of the position of a mobile device, such as mobile devices 13, 14 (e.g., a circle with a particular radius and a center at a particular location). In response to a coarse location request, the pd contains, for example, a description of the geographic "center" of the cell currently serving one of mobile devices 13, 14. The application server 25 may then utilize the geographic description in the pd to customize the location-related content, e.g. to identify a region and deliver content filtered to correspond to that region.

The fine location request is a location request with a location accuracy (e.g., eqop) less than 1000 meters. Such fine location request is fulfilled by providing a relatively precise geographic description of the location of the mobile device, as opposed to the cell currently serving the mobile device, in the pd (e.g., latitude and longitude of the mobile device).

FIG. 2 is a flow diagram of an example of location processing in the system of FIG. 1.

Application server 25 submits the location request for either the first or second type, for example, to the SCG 33 via Parlay X Web Services application programming interfaces (APIs). Parlay X specifications provide a set of standard Web service APIs that allow application servers, such as application server 25, to enable innovative applications/services using the capabilities of the mobile communications network, such as mobile networks 15, 16.

The SCG 33 receives the location request from the application server 25 and validates, for example, that the application server is authorized to submit the location request. In one example, as described in greater detail below, the location request contains an identifier of the application server 25 and the SCG 33 compares the identifier contained in the request with a list of authorized identifiers. If the SCG 33 is unable to validate the location request (e.g., the identifier contained in the request is not found in the authorized identifiers list), the request is denied. The SCG 33 may, for example, notify the application server 25 that the application server 25 is not authorized to submit any request or the SCG 33 may provide a generic failure notification. Alternatively, the SCG 33 may, for example, simply discard the request without any notice to application server 25. The SCG 33, in this example, also verifies that privacy settings related to the owner of one of mobile devices 13, 14 allow the location request. If the privacy settings do not allow the location request, the SCG 33 denies the request. In a similar fashion as the failed validation above, the SCG 33 may notify the application server 25 that privacy settings do not allow the request, the SCG 33 may provide a generic failure notice, or the SCG 33 may simply discard the request without any notice to application server 25. If the SCG 33 validates and verifies the location request, the SCG 33 forwards the request to the LPS 31.

The LPS 31, in this example, receives the location request from the SCG 33. The LPS 31, as described in greater detail in relation to FIG. 4 below, then determines whether the location request is a coarse or fine location request. If the location request is a coarse location request, the LPS 31 also determines, as described further below, whether the location request is for a mobile device that supports communication via a legacy network, such as mobile device 13, or for a mobile device that only supports communication via a 4G LTE network, such as mobile device 14. If the coarse location request is for a mobile device that supports communication via a legacy network (e.g., mobile device 13), the LPS 31 forwards the request to the MPC 61 which interacts with the HLR 62 and MSC 63 to determine the cell identifier of the cell within which mobile device 13 is currently located. If, on the other hand, the coarse location request is for a mobile device that only supports communication via a 4G LTE network (e.g., mobile device 14), the LPS 31 forwards the request to the 4G location server 51 which, as described in greater detail in relation to FIGS. 5-6 below, interacts with the HSS 52 and the MME 53 to determine the cell identifier of the cell within which mobile device 14 is currently located.

Figure 3:
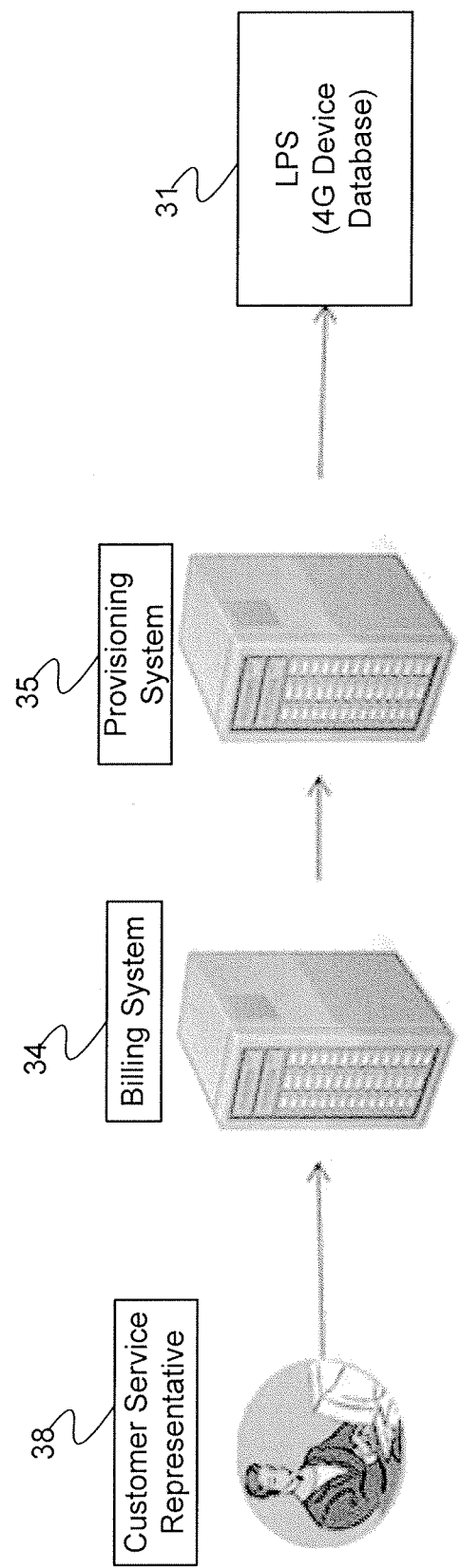
FIG. 3 is a functional block diagram of an example of a system which may be part of the system of FIG. 1 and may be involved in supporting the processing of a location request from a commercial application server.

FIG. 3 is a functional block diagram of an example of a system which may be part of the system of FIG. 1 and may be involved in supporting processing for a location request from a commercial application.

As described above and in greater detail below in relation to FIG. 4, the LPS 31 contains or has other access to a 4G device database that helps determine whether a mobile device supports communication via a legacy network (e.g., mobile device 13) or only supports communication via a 4G LTE network (e.g., mobile device 14). The 4G device database contains a record for each 4G LTE only device, such as mobile device 14. The record includes the mobile directory number (MDN) or mobile subscriber integrated services digital network number (MSISDN) of the mobile device 14, the international mobile subscriber identity (IMSI) related to the mobile device 14, the integrated circuit identifier (ICCID) of the subscriber identity module (SIM) in the mobile device 14, the make and model of the mobile device 14, features supported by the mobile device 14 (e.g., voice over LTE (VoLTE) or data-only), as well as other information related to the mobile device 14. When the owner of mobile device 14, for example, first acquires and desires to activate mobile device 14, the owner will contact a customer service representative 38 of the mobile wireless communication network 16. The customer service representative 38 will activate the mobile device 14 with services in the billing system 34 and the billing system 34 requests provisioning system 35 to provision and activate mobile device 14. Once mobile device 14 is provisioned and activated by provisioning system 35, provisioning system 35 sends the information related to mobile device 14 to the LPS 31 for inclusion in the 4G device database.

FIG. 4 is a flow diagram of an example of processing of a location request as implemented by the system represented by FIG. 1.

In step 401, the LPS 31 receives a location request as described in relation to FIG. 2 above. In step 402, the LPS 31 determines if the location request is a fine or a coarse location request, as described above. A location request contains, among other fields, an enhanced quality of position (eqop) field that defines the accuracy of the request in meters. As described above, an eqop value less than 1000 meters indicates a fine location request and an eqop value equal to or greater than 1000 meters indicates a coarse location request. Thus, in step 402, the LPS 31, for example, determines whether the eqop value is less than 1000 meters or equal to or greater than 1000 meters.

If the eqop value is less than 1000 meters, then the LPS 31, in step 403, completes a user plane location identification to determine the fine location of the mobile device (e.g., mobile device 13 or mobile device 14). Such user plane location identification utilizes an application or other process executing on the mobile devices 13, 14 to acquire the specific location of the mobile device (e.g., mobile device 13 or mobile device 14) within an appropriately small distance range of accuracy. The application or other process executing on the mobile devices 13, 14 is, for example, a secure user plane location (SUPL) agent.

If the eqop value is equal to or greater than 1000 meters, then the LPS 31, in step 404, checks the 4G device database to determine if the mobile device (e.g., mobile device 13 or mobile device 14) supports communication via a legacy network or only communication via the 4G LTE network. If a record in the 4G device database corresponds to the MDN and/or other information of the mobile device (e.g., mobile device 14) contained in the location request, the LPS 31 invokes a control plane function through mobile network 16 by forwarding the coarse location request to the 4G location server 51 in step 405. If, on the other hand, no record in the 4G device database corresponds to the MDN and/or other information of the mobile device (e.g., mobile device 13) contained in the location request, the LPS 31 invokes a control plane function through mobile network 15 by forwarding the coarse location request to the MPC 61 in step 406.

Figure 5:
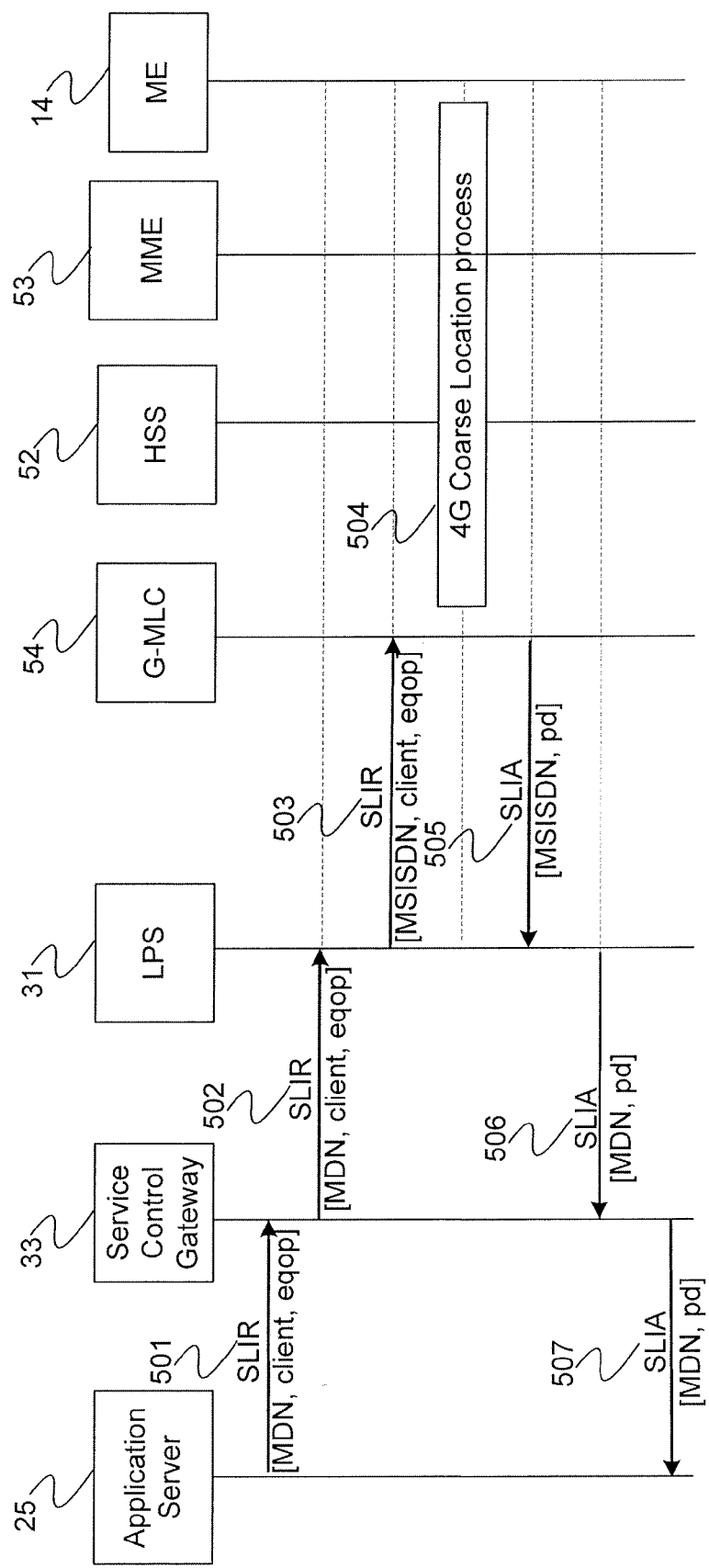
FIG. 5 is a signal flow diagram of an example of a process which may be performed by the system represented by FIG. 1.

FIG. 5 is a flow diagram of an example of a process which may be performed by the system represented by FIG. 1. In particular, FIG. 5, as well as FIG. 6 providing greater detail below, relate to an example of processing a coarse location request for a mobile device that only supports communication via the 4G LTE network (e.g., mobile device 14). As such, the description below related to FIGS. 5 and 6 focuses on the 4G location server 51 and corresponding 4G network elements.

In one example, the application server 25 desires to know the general location of mobile device 14. In step 501, application server 25 submits a location request to the SCG 33. Application server 25, as described above, utilizes Parlay-X Web Services APIs to submit the location request. The location request is, for example, a standard location immediate request (SLIR). The SLIR includes, among other information, the MDN of mobile device 14, client information related to the application server 25, and an eqop value. The SCG 33 refers to, for example, the client information related to the application server 25 in order to perform the validation, as described above in relation to FIG. 2. After validating and verifying the request, as described above, the SCG 33 forwards the location request to the LPS 31 in step 502. After determining the location request is a coarse location request and determining mobile device 14 is a 4G LTE only capable mobile device, the LPS 31 forwards the location request to the G-MLC 54.

In step 504, the G-MLC 54 initiates a control plane function, as described in greater detail below in relation to FIG. 6, to determine the location of mobile device 14. In response to the control plane function initiated in step 504, the G-MLC 54 receives a location estimate related to the cell identifier of the cell within which mobile device 14 is currently located. In this example, the cell identifier is an evolved universal terrestrial radio access network (E-UTRAN) cell global identifier (ECGI). An ECGI is a globally unique value that identifies a cell. The location estimate, as discussed above related to the pd, is a geographically-based description of the "center" of the cell based on the cell identifier. The G-MLC 54 utilizes the location estimate related to the cell identifier of the cell within which mobile device 14 is currently located to generate a location answer. The location answer is, for example, a standard location immediate answer (SLIA). The SLIA includes, among other information, the MDN of mobile device 14 and a pd based on the location estimate. The G-MLC 54, in step 505, forwards the location answer to the LPS 31.

In step 506, the LPS 31 forwards the location answer to the SCG 33. In step 507, the SCG 33 forwards the location answer to the application server 25. At this point, the application server 25 may then utilize the general location of mobile device 14, based on the pd in the location answer, to customize localized content for delivery to mobile device 14. In one example, application server 25 determines, based on the pd in the location answer, that mobile device 14 is currently located within a particular metro area and sends local news/weather for that metro area to mobile device 14.

Figure 6:
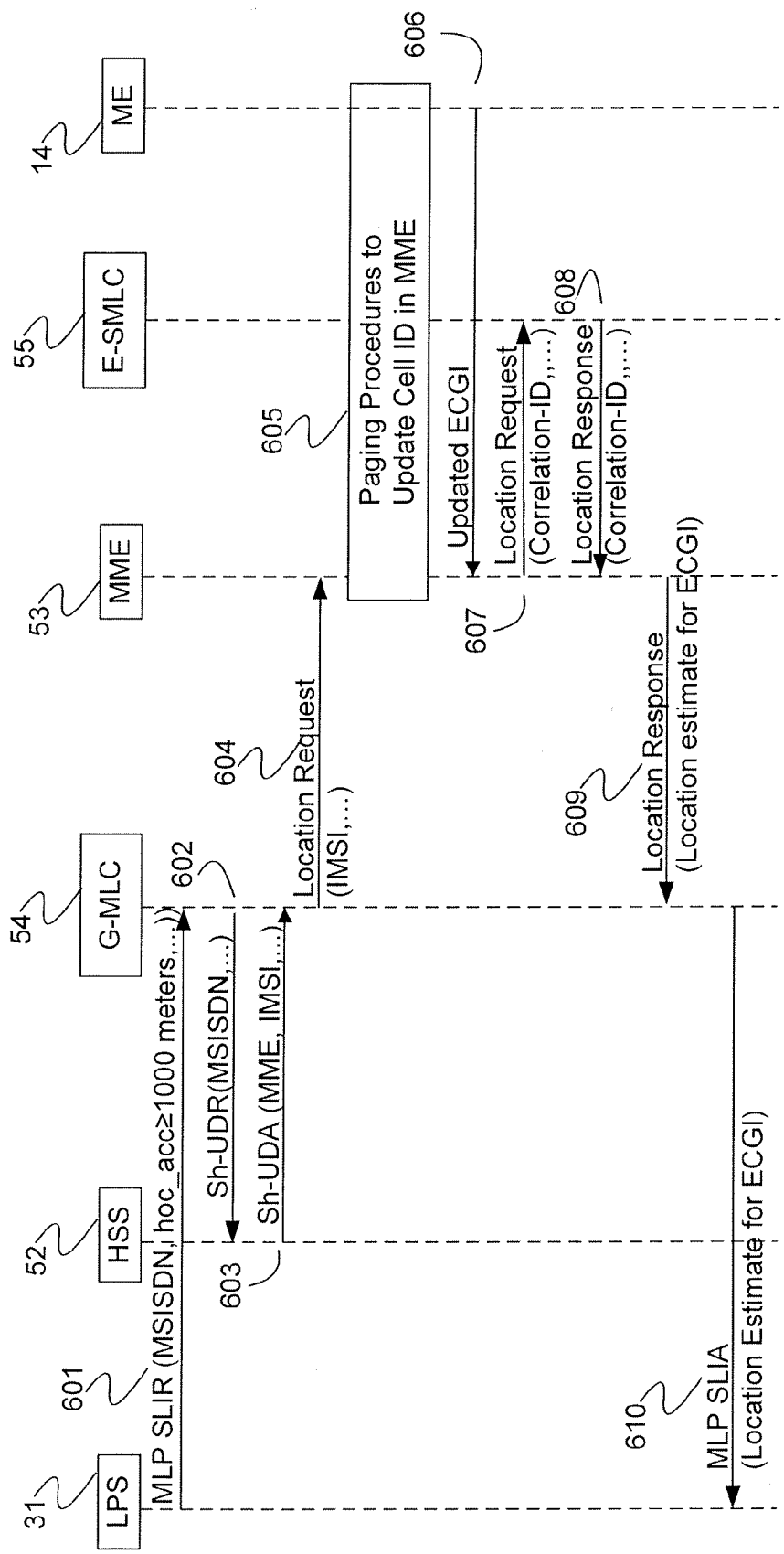
FIG. 6 is a signal flow diagram of an example of the process of FIG. 5 in greater detail.

FIG. 6 is a signal flow diagram of an example of the process of FIG. 5 in greater detail.

In step 601, the LPS 31 forwards a coarse location request for mobile device 14 to the G-MLC 54. Step 601 is the same as step 503 of FIG. 5. As described above, the location request is, for example, a SLIR. The location request is, based on a location accuracy value equal to or greater than 1000 meters, a coarse location request. In step 602, the G-MLC 54 queries the HSS 52 to determine the MME 53 currently serving mobile device 14. The query is, for example, a user-data-request (UDR) over a Sh interface (Sh-UDR). The Sh interface is a Diameter-based interface defined in an IP Multimedia Subsystem (IMS) for service layer-based authorization, authentication, and accounting (AAA) functions. The query includes, among other information, the MSISDN of mobile device 14. The HSS 52 utilizes the MSISDN of mobile device 14 to determine the MME 53 currently serving mobile device 14 and, in step 603, the HSS 52 returns an answer to the query to the G-MLC 54. The answer is, for example, a user-data-answer (UDA) over the Sh interface (Sh-UDA). The answer includes, among other information, the identifier of the serving MME 53 and the IMSI of the SIM in mobile device 14.

In step 604, the G-MLC 54 forwards a location request to the serving MME 53. The location request includes, among other information, the IMSI of the SIM in mobile device 14. If the serving MME 53 contains current information (e.g., cell identifier and/or location estimate of the cell) related to the cell within which mobile device 14 is currently located, the process proceeds to step 609. In step 609, the serving MME 53 provides a location response to the G-MLC 54. The location response includes, among other information, the current location estimate related to the cell identifier of the cell (e.g., center latitude and center longitude) within which mobile device 14 is currently located.

If the serving MME 53 does not contain current information related to the cell within which mobile device 14 is currently located, the process proceeds to step 605. In step 605, the serving MME 53 conducts a paging process to update the cell identifier related to mobile device 14. The paging process involves, for example, the serving MME 53 paging mobile device 14. In step 606, mobile device 14 responds to the page from the serving MME 53 with the cell identifier of the cell within which mobile device 14 is currently located. The cell identifier is, for example, an ECGI of the cell or eNodeB 18 currently providing radio access to mobile device 14.

In step 607, the serving MME 53 submits a location request to the E-SMLC 55 of the 4G location server 51. The location request, in this example, directs the E-SMLC 55 to determine a location estimate related to the current cell identifier related to mobile device 14. The location request includes, among other information, a correlation identifier and the current cell identifier. The correlation identifier is, for example, a unique value that allows the MME 53 and E-SMLC 55 to correlate a location request with a location response exchanged between MME 53 and E-SMLC 55. After the E-SMLC 55 determines the location estimate related to the current cell identifier related to mobile device 14, the E-SMLC 55 provides a location response to the serving MME 53 in step 608. The location response includes, among other information, the correlation identifier from the location request and location estimate related to the current cell identifier related to mobile device 14. The serving MME 53 then completes step 609, as described above.

In step 610, the G-MLC 54 provides a location answer to the LPS 31. Step 610 is the same as step 505 in FIG. 5. The location answer is, for example, a SLIA including a pd based on the location estimate.

As shown by the description above, a variety of the location related functions may be implemented on servers. Although special-built hardware may be used, server functions often are implemented by appropriate programming to configure one or more general-purpose computer platforms that have interfacing to support communications via the particular network(s).

Figures 7, 8:
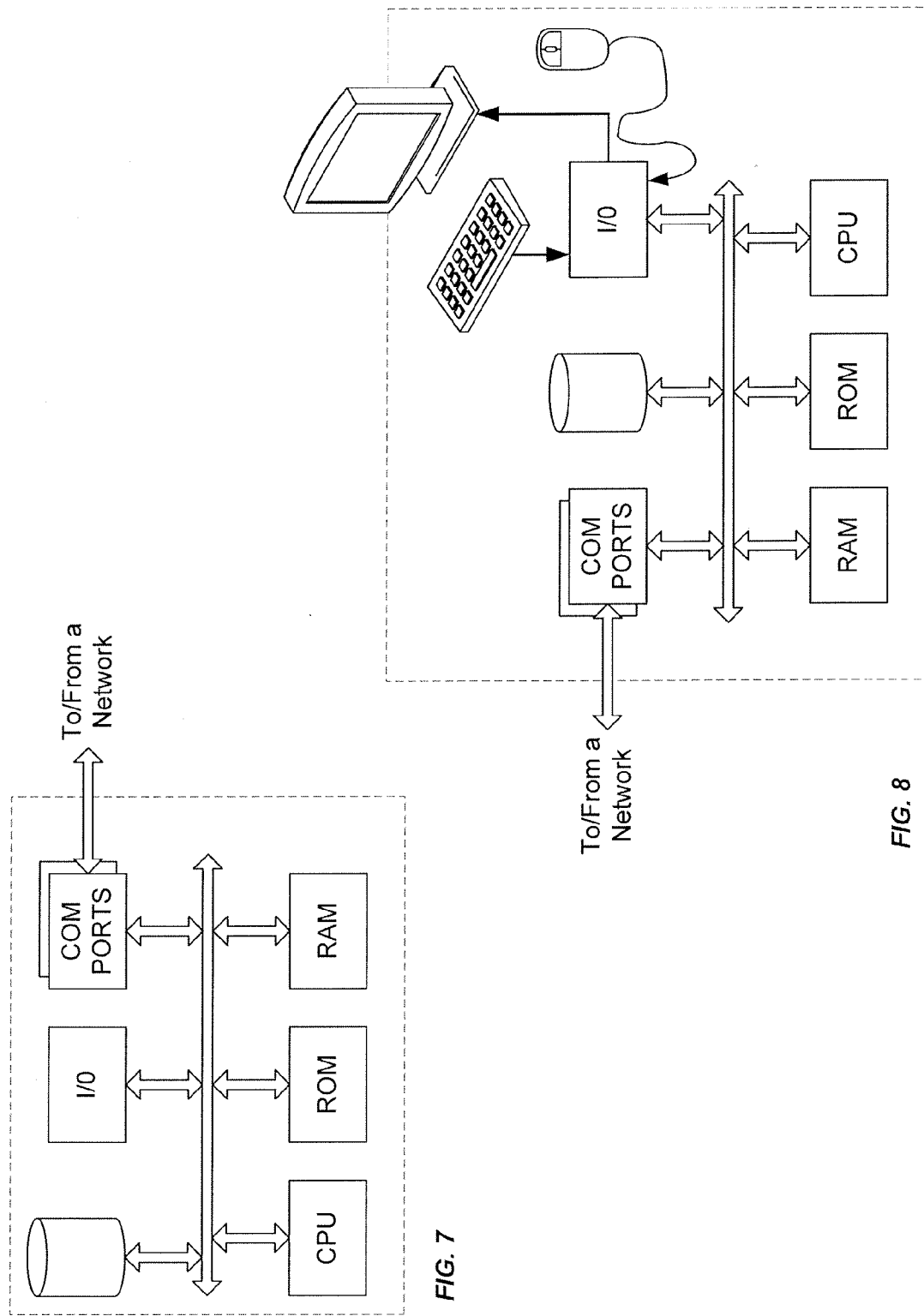
FIG. 7 provides a block diagram of a general purpose computer hardware platform that may be configured as a host or server, for example, to function as any of the server computers shown in FIGS. 1 and 3.
FIG. 8 is a simplified functional block diagram of a personal computer or other work station or user terminal device.

FIG. 7 provides a functional block diagram illustration of a general purpose computer hardware platform. More specifically, FIG. 7 illustrates a network or host computer platform, as may typically be used to implement a server, such as location proxy server 31 and/or any of the other servers/platforms implementing the location proxy server 31 and the location related functions shown in FIG. 2. FIG. 8 depicts a computer with user interface elements, as may be used to implement a personal computer or other type of work station or terminal device, although the computer of FIG. 8 may also act as a server if appropriately programmed. It is believed that the general structure and general operation of such equipment as shown in FIGS. 7 and 8 should be self-explanatory from the high-level illustrations.

A server, for example, includes a data communication interface for packet data communication (see FIG. 7). The server also includes a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the location techniques discussed herein may be downloaded and/or updated from a computer platform, for example, to configure the location proxy server or other server (e.g. FIG. 1) or from a host computer or the like communicating with the mobile device via the network (e.g. FIG. 1).

A computer type user terminal device, such as a PC or tablet computer, similarly includes a data communication interface CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the techniques for processing a location request for a commercial application server and related communications outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory or tangible storage media, more general terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a network configured to provide mobile wireless communication service to mobile devices;
a first location server configured to provide location services for only a first portion of the network operating in compliance with a legacy network standard;
a second location server configured to provide location services for only a second portion of the network operating in compliance with a long term evolution (LTE) network standard; and
a location proxy server configured to:
invoke a first control plane function through the network via the first location server, to locate a mobile device serviced by the first portion of the network in response to a first location request of a first type;
invoke a second control plane function through the network via the second location server, to locate a mobile device serviced only by the second portion of the network in response to a second location request of the first type; and
invoke a user plane function to locate a mobile device serviced by either the first portion of the network or the second portion of the network in response to a location request of a second type,
wherein the system does not handle any enhanced emergency (E911) location requests.

2. The system of claim 1, further comprising:
a home location register; and
a mobile serving center, wherein:
each location request of the first type is a coarse location request;
the first location server is a mobile position center; and
the mobile position center is configured to utilize the home location register and the mobile serving center to determine a cell identifier of a cell within which the mobile device is currently located.

3. The system of claim 2, wherein the coarse location request includes a requested accuracy equal to or larger than 1000 meters.

4. The system of claim 1, further comprising:
a home subscriber server; and
a serving mobility management entity, wherein:
each location request of the first type is a coarse location request;
the second location server comprises a gateway mobile location center; and
the gateway mobile location center is configured to utilize the home subscriber server and the serving mobility management entity to determine a cell identifier of a cell within which the mobile device is currently located.

5. The system of claim 4, wherein the coarse location request includes a requested accuracy equal to or larger than 1000 meters.

6. The system of claim 4, wherein the gateway mobile location center is further configured to:
query the home subscriber server for an international mobile subscriber identity and the serving mobility management entity related to the mobile device;
obtain, from the serving mobility management entity, the cell identifier of the cell within which the mobile device is currently located; and
send, to the location proxy server, a location answer based on the cell identifier in response to the coarse location request.

7. The system of claim 6, wherein:
the second location server is a Secure User Plane Location (SUPL) server;
the mobile device comprises a SUPL agent; and obtaining the cell identifier does not engage the SUPL agent.

8. The system of claim 4, wherein:
the second location server further comprises a serving mobile location center;
the gateway mobile location center is further configured to:
   query the home subscriber server for an international mobile subscriber identity and the serving mobility management entity related to the mobile device;
   request, from the serving mobility management entity, the cell identifier of the cell within which the mobile device is currently located;
   receive, from the serving mobility management entity, the cell identifier of the cell within which the mobile device is currently located; and
   send, to the location proxy server, a location answer based on the cell identifier in response to the location request; and
the serving mobility management entity is configured to:
   receive, from the gateway mobile location center, the request for the cell identifier for the cell within which the mobile device is currently located;
   upon determining the serving mobility management entity does not have a current cell identifier of the cell within which the mobile device is currently located, send a page to the mobile device;
   receive, from the mobile device in response to the page, the current cell identifier of the cell within which the mobile device is currently located;
   send, to the serving mobile location center, a request to update location information related to the mobile device;
   receive, from the serving mobile location center, a response to the request indicating location information related to the mobile device is updated; and
   upon receipt of the response from the serving mobile location center, send the current cell identifier of the cell within which the mobile device is currently located to the gateway mobile location center.

9. The system of claim 8, wherein:
the second location server is a Secure User Plane Location (SUPL) server;
the mobile device comprises a SUPL agent; and
the page to the mobile device does not engage the SUPL agent.

10. A computer, comprising:
a processor configured to control operations of the computer;
a communications interface configured to communicate with a mobile wireless communication network;
a memory;
a location proxy server program in the memory, wherein execution of the location proxy server program by the processor of the computer configures the computer to implement functions, including functions to:
   invoke, in response to a first location request of a first type, a first control plane function through the network via a first location server computer of a first portion of the network operating in compliance with a legacy network standard, to locate a mobile device serviced by the first portion of the network;
   invoke, in response to a second location request of the first type, a second control plane function through the network via a second location server computer of a second portion of the network operating in compliance with a long term evolution (LTE) network standard, to locate a mobile device serviced only by the second portion of the network; and
   invoke, in response to a location request of a second type and without interaction with a location server computer, a user plane function of the location proxy server program to locate a mobile device serviced by the first portion of the network or the second portion of the network.

11. The computer of claim 10, wherein the implemented function to invoke the first control plane function further comprises functions to:
   determine that the location request is a coarse location request based on a quality of position value equal to or larger than 1000 meters;
   determine that the location request is a request to locate the mobile device serviced by the first portion of the network based on an absence of a mobile device identifier related to the mobile device serviced by the first portion of the network in a device database; and
   forward the coarse location request for the mobile device serviced by the first portion of the network to a mobile position center function of the first location server computer.

12. The computer of claim 10, wherein the implemented function to invoke the second control plane function further comprises functions to:
   determine that the location request is a coarse location request based on a quality of position value equal to or larger than 1000 meters;
   determine that the location request is a request to locate the mobile device serviced only by the second portion of the network based on a presence of a mobile device identifier related to the mobile device serviced only by the second portion of the network in a device database; and
   forward the coarse location request for the mobile device serviced only by the second portion of the network to a gateway mobile location center function of the second location server computer.

13. The computer of claim 10, wherein execution of the location proxy server program by the processor of the computer configures the computer to implement functions, including functions to:
   receive, from an application server computer implementing a Parlay-X Web Services API program for initiating location requests from the mobile wireless communication network, at least one of the first location request of the first type, the second location request of the first type, or the location request of the second type; and
   upon receipt of a location answer in response to the at least one of the first location request of the first type, the second location request of the first type, or the location request of the second type, forward the location answer to the application server computer implementing the Parlay-X Web Services API program.

14. A computer, comprising:
a processor configured to control operations of the computer;
a communications interface;
a memory;
a location server program comprising:
   a gateway mobile location center program in the memory, wherein execution of the gateway mobile location center program by the processor of the computer configures the computer to:
      receive, from an application server via a location proxy server, a request to invoke a control plane function through a mobile wireless communication network to locate a mobile device serviced only by a portion of the network operating in compliance with a long term evolution (LTE) network standard in response to a location request;

query, as part of the control plane function, a home subscription system of the network for an international mobile subscriber identity of the mobile device and a serving mobility management entity currently serving the mobile device;

obtain, from the serving mobility management entity, a cell identifier of a cell in which the mobile device is currently located; and send, to the location proxy server, a location answer based on the cell identifier in response to the location request; and a serving mobile location center program, wherein execution of the serving mobile location center program by the processor of the computer configures the computer to:

receive, from the serving mobility management entity, an updated cell identifier of the cell in which the mobile device is currently located in response to the serving mobility management entity receiving the updated cell identifier from the mobile device in response to a page from the serving mobility management entity; and respond, to the serving mobility management entity, indicating the updated cell identifier was received.

15. The computer of claim 14, wherein the location request is a coarse location request based upon a quality of position value equal to or larger than 1000 meters.

16. The computer of claim 14, wherein:
the location server program is a Secure User Plane Location (SUPL) server;
the mobile device comprises a SUPL agent; and
obtaining the cell identifier of the cell in which the mobile device is currently located does not engage the SUPL agent.

17. The computer of claim 14, wherein:
the location server program is a Secure User Plane Location (SUPL) server;
the mobile device comprises a SUPL agent; and
receiving the updated cell identifier does not engage the SUPL agent.

18. The computer of claim 14, wherein the cell identifier is an Evolved Universal Terrestrial Radio Access Network (E-UTRAN) cell global identifier (ECGI).

19. The computer of claim 14, wherein the application server implements a Parlay X client for initiating location requests from the mobile wireless communication network.

20. The computer of claim 14, wherein the location answer comprises a standard location immediate answer that includes a mobile directory number of the mobile device and a position description of the mobile device.

* * * * *